United States Patent
Copeland

(10) Patent No.: US 8,534,074 B2
(45) Date of Patent: Sep. 17, 2013

(54) DUAL CLUTCH ARRANGEMENT AND METHOD

(75) Inventor: Andrew D. Copeland, Greenwood, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 1155 days.

(21) Appl. No.: 12/464,906

(22) Filed: May 13, 2009

(65) Prior Publication Data

US 2009/0320491 A1  Dec. 31, 2009

Related U.S. Application Data

(60) Provisional application No. 61/052,659, filed on May 13, 2008.

(51) Int. Cl.
*F02C 1/00* (2006.01)

(52) U.S. Cl.
USPC .......................... 60/772; 60/39.163; 60/226.1

(58) Field of Classification Search
USPC ................. 60/39.162, 39.163, 268, 792, 772, 60/226.1; 416/1, 169 R; 415/1, 123; 192/48.3, 192/48.92
See application file for complete search history.

(56) References Cited

U.S. PATENT DOCUMENTS

| 3,722,213 A | 3/1973 | Carter et al. |
|---|---|---|
| 4,047,842 A * | 9/1977 | Avena et al. ................... 416/152 |
| 4,064,692 A | 12/1977 | Johnson et al. |
| 4,080,785 A | 3/1978 | Koff et al. |
| 4,679,394 A | 7/1987 | Taylor |
| 4,786,016 A | 11/1988 | Presz, Jr. et al. |
| 4,791,783 A | 12/1988 | Neitzel |
| 4,829,850 A | 5/1989 | Soloy |
| 5,120,516 A | 6/1992 | Ham et al. |
| 5,201,798 A * | 4/1993 | Hogan ............................. 60/791 |

(Continued)

FOREIGN PATENT DOCUMENTS

| EP | 1619370 A1 | 1/2006 |
|---|---|---|
| EP | 1271007 B1 | 11/2006 |
| GB | 1060237 | 3/1967 |
| GB | 2424048 | 9/2006 |

OTHER PUBLICATIONS

European Search Report, Feb. 7, 2012, EP 09251309, Rolls Royce Corporation, 7 pages.

*Primary Examiner* — Phutthiwat Wongwian
(74) *Attorney, Agent, or Firm* — Krieg DeVault LLP

(57) ABSTRACT

A dual clutch arrangement is disclosed herein. The dual clutch arrangement includes a first input rotatable member. The dual clutch arrangement also includes an output rotatable member. The dual clutch arrangement also includes a first clutch coupling the first input rotatable member and the output rotatable member such that the first input rotatable member drives the output rotatable member in rotation. The first clutch is operable to be overrun. The dual clutch arrangement also includes a second input rotatable member. The dual clutch arrangement also includes a second clutch operable to selectively couple the second input rotatable member and the output rotatable member such that the second input rotatable member drives the output rotatable member in rotation. The first clutch is overrun when the second clutch is engaged. The dual clutch arrangement can be one exemplary way of practicing the method of operating a turbine engine to produce thrust for a vehicle, directing air into the turbine engine with a fan during said operating step, and changing a speed of the fan during said operating step to change a bypass ratio of the turbine engine.

29 Claims, 6 Drawing Sheets

(56) References Cited

U.S. PATENT DOCUMENTS

| | | | | |
|---|---|---|---|---|
| 5,267,433 | A | * | 12/1993 | Burch .............................. 60/788 |
| 5,281,190 | A | | 1/1994 | Koivunen |
| 5,452,988 | A | * | 9/1995 | Short et al. .................... 416/151 |
| 5,478,203 | A | * | 12/1995 | Barker et al. .................. 415/147 |
| 5,524,847 | A | | 6/1996 | Brodell et al. |
| 5,529,263 | A | | 6/1996 | Rudolph |
| 5,771,681 | A | | 6/1998 | Rudolph |
| 5,813,214 | A | | 9/1998 | Moniz et al. |
| 5,908,080 | A | | 6/1999 | Bigley et al. |
| 5,992,592 | A | | 11/1999 | Showalter |
| 5,996,754 | A | | 12/1999 | Reed, Jr. et al. |
| 6,010,304 | A | | 1/2000 | Moniz et al. |
| 6,012,561 | A | | 1/2000 | Reed, Jr. et al. |
| 6,021,880 | A | | 2/2000 | Reed, Jr. et al. |
| 6,027,424 | A | | 2/2000 | Reynolds |
| 6,044,719 | A | | 4/2000 | Reed, Jr. et al. |
| 6,044,931 | A | | 4/2000 | Reed, Jr. et al. |
| 6,071,076 | A | | 6/2000 | Ansari et al. |
| 6,082,511 | A | | 7/2000 | Shirataki |
| 6,209,311 | B1 | | 4/2001 | Itoh et al. |
| 6,364,809 | B1 | | 4/2002 | Cherry |
| 6,463,821 | B1 | | 10/2002 | Reed, Jr. et al. |
| 6,546,735 | B1 | | 4/2003 | Moniz et al. |
| 6,619,030 | B1 | | 9/2003 | Seda et al. |
| 6,684,626 | B1 | | 2/2004 | Orlando et al. |
| 6,711,887 | B2 | | 3/2004 | Orlando et al. |
| 6,739,120 | B2 | | 5/2004 | Moniz et al. |
| 6,745,880 | B1 | | 6/2004 | Yuergens |
| 6,763,652 | B2 | | 7/2004 | Baughman et al. |
| 6,763,653 | B2 | | 7/2004 | Orlando et al. |
| 6,763,654 | B2 | | 7/2004 | Orlando et al. |
| 6,766,891 | B2 | | 7/2004 | Kerr |
| 6,773,368 | B1 | | 8/2004 | Williames |
| 6,935,837 | B2 | | 8/2005 | Moniz et al. |
| 7,007,488 | B2 | | 3/2006 | Orlando et al. |
| 7,096,674 | B2 | | 8/2006 | Orlando et al. |
| 7,186,073 | B2 | | 3/2007 | Orlando et al. |
| 7,195,446 | B2 | | 3/2007 | Seda et al. |
| 7,195,447 | B2 | | 3/2007 | Moniz et al. |
| 7,269,938 | B2 | | 9/2007 | Moniz et al. |
| 7,278,946 | B2 | | 10/2007 | Williames et al. |
| 7,290,386 | B2 | | 11/2007 | Orlando et al. |
| 7,296,398 | B2 | | 11/2007 | Moniz et al. |
| 7,299,621 | B2 | | 11/2007 | Bart et al. |
| 7,334,392 | B2 | | 2/2008 | Moniz et al. |
| 7,334,981 | B2 | | 2/2008 | Moniz et al. |
| 7,353,647 | B2 | | 4/2008 | Orlando et al. |
| 7,363,995 | B2 | | 4/2008 | Downs et al. |
| 7,430,852 | B2 | | 10/2008 | Beutin et al. |
| 7,458,202 | B2 | | 12/2008 | Moniz et al. |
| 7,481,062 | B2 | | 1/2009 | Gaines et al. |
| 7,490,460 | B2 | | 2/2009 | Moniz et al. |
| 7,490,461 | B2 | | 2/2009 | Moniz et al. |
| 7,493,753 | B2 | | 2/2009 | Moniz et al. |
| 7,493,754 | B2 | | 2/2009 | Moniz et al. |
| 7,500,352 | B2 | | 3/2009 | Bradbrook |
| 7,510,371 | B2 | | 3/2009 | Orlando et al. |
| 7,513,102 | B2 | | 4/2009 | Moniz et al. |
| 7,513,103 | B2 | | 4/2009 | Orlando et al. |
| 7,526,913 | B2 | | 5/2009 | Orlando et al. |
| 2003/0163984 | A1 | | 9/2003 | Seda et al. |
| 2004/0020186 | A1 | | 2/2004 | Orlando et al. |
| 2006/0288686 | A1 | | 12/2006 | Cherry et al. |
| 2007/0084183 | A1 | | 4/2007 | Moniz et al. |
| 2007/0084186 | A1 | | 4/2007 | Orlando et al. |
| 2007/0087892 | A1 | | 4/2007 | Orlando et al. |
| 2007/0125066 | A1 | | 6/2007 | Orlando et al. |
| 2007/0137175 | A1 | | 6/2007 | Moniz |
| 2007/0157596 | A1 | | 7/2007 | Moniz |
| 2007/0189848 | A1 | | 8/2007 | Clemens |
| 2007/0220999 | A1 | * | 9/2007 | Hatori et al. .................... 74/330 |
| 2007/0234704 | A1 | | 10/2007 | Moniz et al. |
| 2007/0240399 | A1 | | 10/2007 | Orlando et al. |
| 2008/0014095 | A1 | | 1/2008 | Moniz et al. |
| 2008/0053099 | A1 | | 3/2008 | Venkataramani et al. |
| 2008/0053100 | A1 | | 3/2008 | Venkataramani et al. |
| 2008/0072567 | A1 | | 3/2008 | Moniz et al. |
| 2008/0072568 | A1 | | 3/2008 | Moniz et al. |
| 2008/0072569 | A1 | | 3/2008 | Moniz et al. |
| 2008/0075590 | A1 | | 3/2008 | Moniz et al. |
| 2008/0098713 | A1 | | 5/2008 | Orlando et al. |
| 2008/0098714 | A1 | | 5/2008 | Orlando et al. |
| 2008/0098715 | A1 | | 5/2008 | Orlando et al. |
| 2008/0098716 | A1 | | 5/2008 | Orlando et al. |
| 2008/0098717 | A1 | | 5/2008 | Orlando et al. |
| 2008/0098718 | A1 | | 5/2008 | Henry et al. |
| 2008/0110152 | A1 | | 5/2008 | Kemper et al. |
| 2008/0110153 | A1 | | 5/2008 | Seda et al. |
| 2008/0110154 | A1 | | 5/2008 | Kemper et al. |
| 2008/0112791 | A1 | | 5/2008 | Lee et al. |
| 2008/0112793 | A1 | | 5/2008 | Lee et al. |
| 2008/0112794 | A1 | | 5/2008 | Lee et al. |
| 2008/0112795 | A1 | | 5/2008 | Lee et al. |
| 2008/0112801 | A1 | | 5/2008 | Moniz et al. |
| 2008/0112802 | A1 | | 5/2008 | Orlando et al. |
| 2008/0148708 | A1 | | 6/2008 | Chou et al. |
| 2008/0148881 | A1 | | 6/2008 | Moniz et al. |
| 2008/0152477 | A1 | | 6/2008 | Moniz et al. |
| 2008/0159851 | A1 | | 7/2008 | Moniz et al. |
| 2008/0159852 | A1 | | 7/2008 | Stephenson et al. |
| 2008/0159856 | A1 | | 7/2008 | Moniz et al. |
| 2009/0064683 | A1 | | 3/2009 | Moniz et al. |

* cited by examiner

DUAL CLUTCH ARRANGEMENT AND METHOD

CROSS-REFERENCE TO RELATED APPLICATIONS

This application claims the benefit of U.S. Provisional Patent Application Ser. No. 61/052,659 for a CLUTCH ARRANGEMENT FOR SHAFTS, filed on May 13, 2008, which is hereby incorporated by reference in its entirety.

STATEMENT REGARDING FEDERALLY SPONSORED RESEARCH OR DEVELOPMENT

The present invention was made under U.S. Government Contract Number F33615-03-D-2357 awarded by the Department of Defense, and the government may have certain rights in the present invention.

BACKGROUND OF THE INVENTION

1. Field of the Invention

The invention relates to a dual clutch arrangement operable to selectively couple two structures such as shafts.

2. Description of Related Prior Art

It can be desirable to selectively couple two structures, such as shafts, gears, or plates for example, in order to jointly rotate the two structures. The structures can be uncoupled when only one of the structures is to rotate or when the two structures are to rotate at different speeds. A clutch can be operably positioned to couple the two structures to rotate at the same speed. Alternatively, the clutch can be disengaged to allow the two structures to rotate relative to one another.

SUMMARY OF THE INVENTION

In summary, the invention is a dual clutch arrangement. The dual clutch arrangement includes a first input rotatable member. The dual clutch arrangement also includes an output rotatable member. The dual clutch arrangement also includes a first clutch coupling the first input rotatable member and the output rotatable member such that the first input rotatable member drives the output rotatable member in rotation. The first clutch is operable to be overrun. The dual clutch arrangement also includes a second input rotatable member. The dual clutch arrangement also includes a second clutch operable to selectively couple the second input rotatable member and the output rotatable member such that the second input rotatable member drives the output rotatable member in rotation. The first clutch is overrun when the second clutch is engaged. The dual clutch arrangement can be one exemplary way of practicing a method of operating a turbine engine to produce thrust for a vehicle, directing air into the turbine engine with a fan during said operating step, and changing a speed of the fan during said operating step to change a bypass ratio of the turbine engine without changing a speed of rotation of a shaft driving the fan.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF AN EXEMPLARY EMBODIMENT

The inventor has developed a dual clutch arrangement that can be practiced in any operating environment in which it is desired to rotate a structure, such as a shaft or any other rotatable member, at different speeds. As set forth below, the invention can be practiced in a turbine engine to vary the rotational speed of a fan, but the invention is not limited to turbine engines. Applying the dual clutch arrangement in a turbine engine allows the turbine engine to be operated in a new and non-obvious method; the bypass ratio of the turbine engine can be changed during operation of the turbine engine by changing the rotational speed of the fan without changing the rotational speed of the shaft driving the fan. The turbine engine can operate with the fan rotating at a relatively lower speed in a first mode of operation and in a second mode of operation with the fan rotating at a relatively higher speed. As a result, the bypass ratio during the first mode of operation is different than the bypass ratio during the second mode of operation. In the first mode of operation, the turbine engine can be operated at a higher level of fuel efficiency and/or at a lower rate of fuel consumption. In the second mode of operation, the turbine engine can be operated at a higher level of thrust output. It is noted that this inventive method of operating a turbine engine can be carried with other arrangements and is not limited to the dual clutch arrangement of the exemplary embodiment described below.

Figure 1:
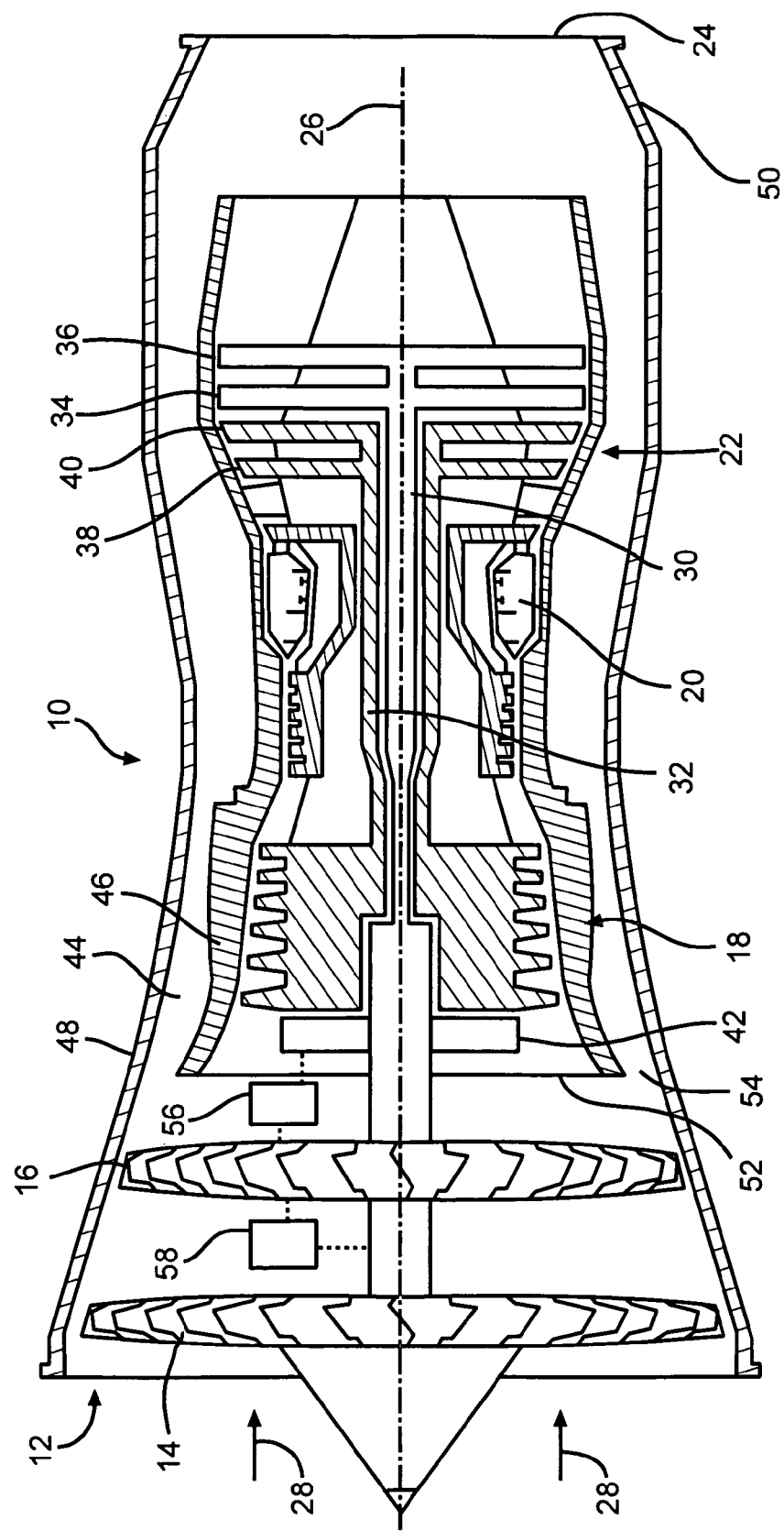
FIG. 1 is a schematic cross-section of an turbine engine incorporating an exemplary embodiment of the invention.

Referring to FIG. 1, a turbine engine 10 can include an inlet 12, a first fan 14 and second fan 16. The exemplary fans 14, 16 can be an assembly of, by way of example and not limitation, a disk, a plurality of blades received in slots in the disk, and a retainer. In alternative embodiments, the fan can be a "blisk" wherein the blades and the disk are integral. The turbine engine can also include a compressor section 18, a combustor section 20, and a turbine section 22. The turbine engine 10 can also include an exhaust 24. The fans 14, 16, the compressor section 18, and the turbine section 22 can be arranged to rotate about a centerline axis 26. A working fluid such as air can be drawn into the turbine engine 10 as indicated by the arrows referenced at 28. The fans 14, 16 direct a portion of the working fluid to the compressor section 18 where it is compressed. The fans 14, 16 can be viewed as initial compressor stages since the fans 14, 16 impart a pressure increase to the working fluid. The compressed fluid is mixed with fuel and ignited in the combustor section 20. Combustion gases exit the combustor section 20 and flow through the turbine section 22. Energy is extracted from the combustion gases in the turbine section 22.

Shafts 30, 32 are shown disposed for rotation about the centerline axis 26 of the turbine engine 10. Alternative embodiments of the invention can include any number of shafts. The shafts 30, 32 can be journaled together for relative rotation. The shaft 30 can be a low pressure shaft supporting low pressure turbine blade rows 34, 36 of a low pressure portion of the turbine section 22. In alternative embodiments of the invention, the low pressure shaft 30 can also support compressor blades of a low pressure portion of the compressor section 18.

The shaft 32 can encircle the shaft 30. As set forth above, the shafts 30, 32 can be journaled together, wherein bearings are disposed between the shafts 30, 32 to permit relative rotation. The shaft 32 can be a high pressure shaft supporting high pressure turbine blade rows 38, 40 of a high pressure portion of the turbine section 22. In the exemplary embodiment, the shaft 32 can also support the blade rows of the compressor section 18. The high pressure portion of the turbine section 22 can thus drive the multi-stage compressor section in the exemplary embodiment. It is noted that this arrangement is not required of the broader invention.

It is noted that either shaft 30, 32 can drive other structures, such as a gear train, a fan, one or more propeller shafts, a rotor, a tower shaft or any other shaft, or any other structure. In the schematic view of FIG. 1, the low pressure shaft 30 can be coupled to a gear assembly 42. The gear assembly 42 can generate rotational output at a speed reduced from the speed of the shaft 30. By way of example and not limitation, the gear assembly 42 can be a dual planetary arrangement with a center gear for receiving input from the shaft 30 and at least one orbiting gear mated with the center gear for delivering output. The rotational output can be derived directly from the orbiting gear or from a carrier coupled to the center of rotation of the orbiting gear. It is noted that other arrangements for extracting power from the shaft 30, or any other input shaft can be applied in other embodiments of the invention.

The fans 14, 16 can also direct a portion of the working fluid to a bypass duct 44. The bypass duct 44 can be an annular gap between a compressor casing 46 of the compressor section 18 and an outer casing or nacelle 48 of the turbine engine 10. Bypass flow passes through the bypass duct 44 and may or may not rejoin the portion of the flow that passes through the core engine (the compressor section 18, the combustor section 20, and the turbine section 22). The bypass flow and the core engine flow can join upstream of the exhaust 24 through an integrated propelling nozzle 50 as shown in FIG. 1. Alternatively, the bypass flow and core engine flow can exit the turbine engine 10 through separate propelling nozzles.

The bypass ratio of the turbine engine is the ratio between the mass flow rate of air passing through the core engine and the mass flow rate of air passing through the bypass duct. If the fan 14 drives two kilograms of air around the core engine and into the bypass duct 44 for every kilogram that passes through the core engine, the engine is said to have a bypass ratio of 2, or 2:1. Thus, in a bypass ratio of "2:1" the first number can correspond to the mass flow rate of air passing through the bypass duct 44 and the second number can correspond to the mass flow rate of air passing through the core engine.

Generally, bypass ratios can range from 0 to 17. A relatively high bypass ratio, such as 11-17, is generally associated with civilian aircraft. In addition, a relatively high bypass ratio can result in relatively lower exhaust speed but also in reduced fuel consumption. Relatively high bypass ratios are also generally associated with lower noise, since the relatively large flow of air surrounding the exhaust from the core engine helps to buffer the noise produced by the core engine flow. A lower bypass ratio, such as 0 to 2, generally results in higher exhaust speed and increased fuel consumption. A lower bypass ratio is generally desirable to sustain higher airspeeds and is associated with military aircraft.

The mass flow rates of air passing through the core engine and through the bypass duct 44 are related to the cross-sectional area of the respective inlets of the core engine and the bypass duct 44. The inlet of the core engine is referenced schematically at 52 and the inlet of the bypass duct 44 is referenced schematically at 54. The mass flow rates are also related to the mean or generalized velocities of the air entering the respective inlets 52, 54. The fan 16 can impart a pressure increase to the working fluid and this pressure increase is manifest by the velocity of the working fluid. As set forth below, the speed of rotation of the fan 16 can be varied and, as a result, the velocity of the working fluid can change during operation. Further, the bypass ratio can change when the generalized velocities of the air entering the respective inlets 52, 54 change.

Figure 2:
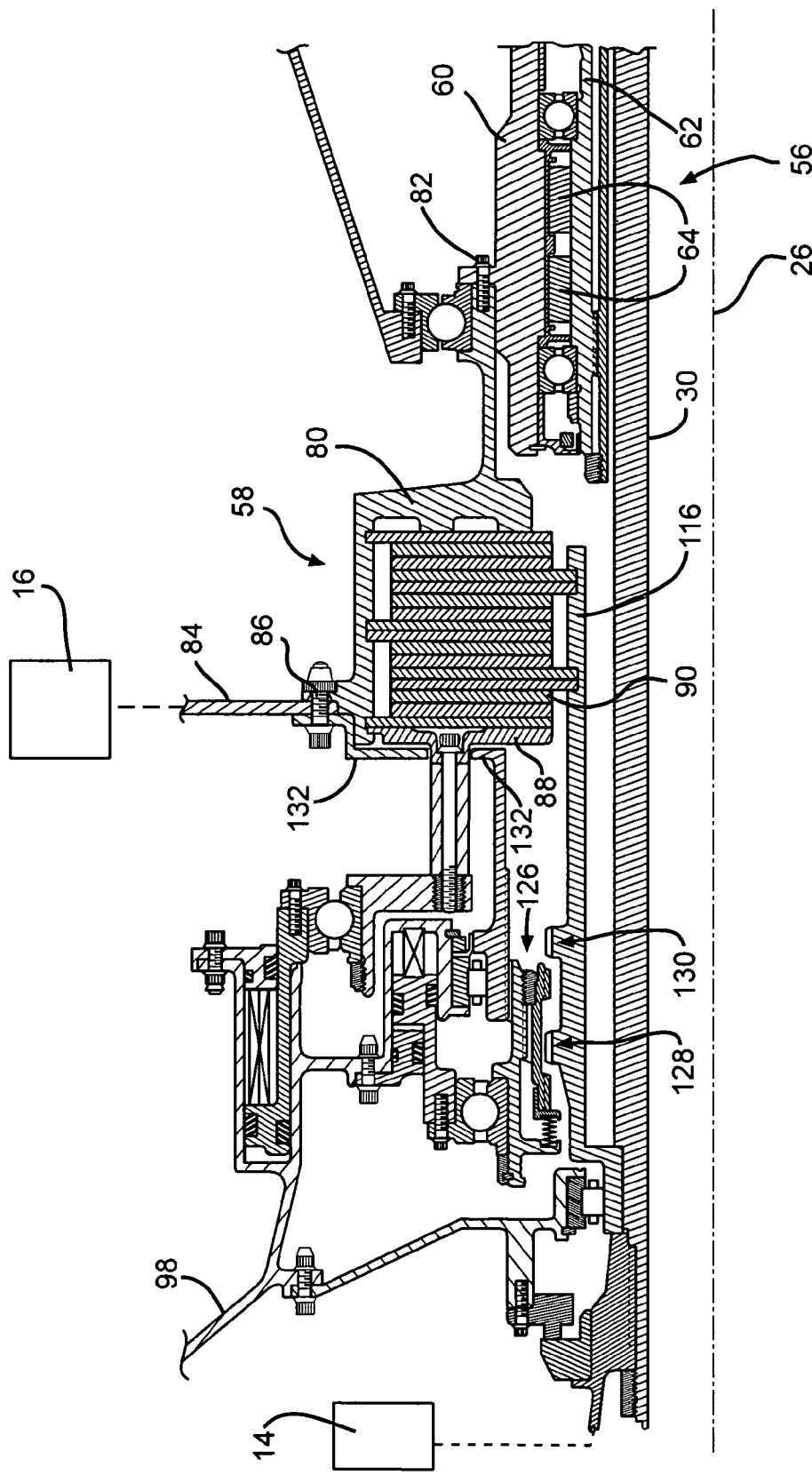
FIG. 2 is a detailed cross-section of an exemplary embodiment of the invention.

FIG. 1 schematically shows the fan 16 coupled to two clutches 56, 58. FIG. 2 shows a detailed cross section of an exemplary embodiment. A first rotatable output member such as the shaft 30 can be coupled to a first shaft member 60 and be operable to rotate about the centerline axis 26. The first shaft member 60 can be driven in rotation about the centerline axis 26 through a connection defined by the first clutch 56. In the exemplary embodiment of the invention, the first clutch 56 is a sprag clutch having an inner race 62. The first shaft member 60 can define an outer race of the first clutch 56. The first clutch 56 can also include a plurality of individual sprags 64 positioned between the inner race 62 and the first shaft member 60.

Figure 3:
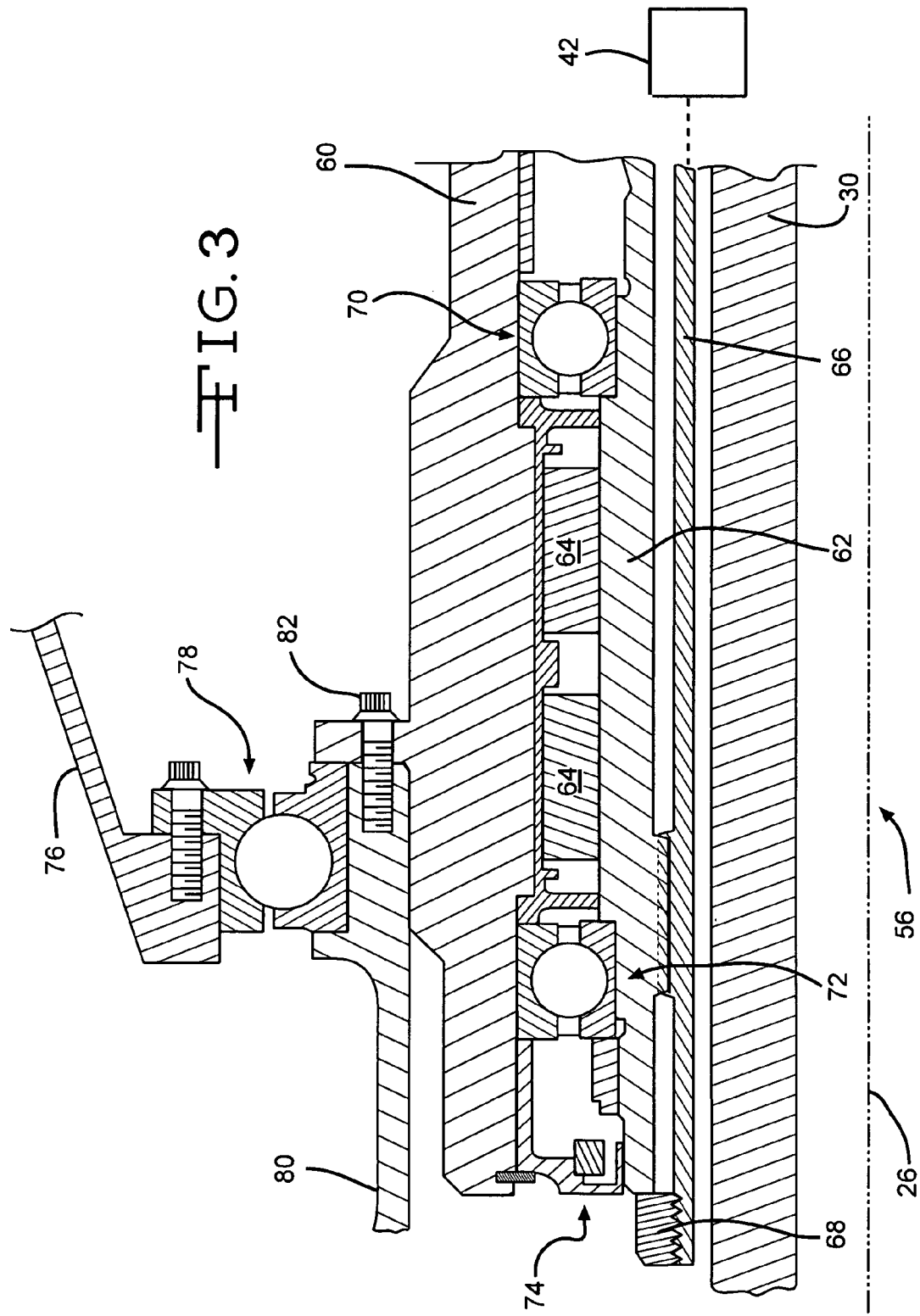
FIG. 3 is a magnified portion of FIG. 1 showing a first clutch for coupling an output rotatable member to a first input rotatable member.

Referring now to FIG. 3, the inner race 62 can be fixed for rotation with an inner sleeve 66 driven in rotation by the gear assembly 42. The inner race 62 can be fixed to the sleeve 66 by a spanner nut 68. Thus, when the sleeve 66 rotates, the inner race 62 can rotate. When the inner race 62 rotates, the sprags 64 can engage the first shaft member 60 and cause the first shaft member 60 to rotate. Bearings 70 and 72 can be positioned between the inner race 62 and the first shaft member 60. A seal 74 can be operable to at least partially seal the cavity defined between the inner race 62 and the first shaft member 60. The first shaft member 60 can be supported from a radially outward direction by a stationary structure 76 and a bearing 78.

In the exemplary embodiment of the invention, the rotation of the first shaft member 60 through the first clutch 56 can produce a particular output speed for the first shaft member 60, such as a low-speed mode of operation. The first shaft member 60 can be fixed for rotation with a second shaft member 80 through at least one bolt 82. Referring to FIG. 2 again, the second shaft member 80 can be fixed for rotation with a third shaft member 84 through at least one bolt 86. The third shaft member 84 can be fixed for rotation, directly or indirectly, to fan 16. Thus, the fan 16 can be driven in rotation by the shaft 30 through the gear assembly 42 (shown in FIGS. 1 and 3), the first clutch 56, and the shaft members 60, 80, 84. The shaft members 60, 80, 84 can jointly define an output rotatable member for driving the fan 16. The sleeve 66 can define a first input shaft coupled to the output rotatable member or shaft defined by the shaft members 60, 80, 84. It is noted that these shafts are exemplary and other configurations of rotationally driving and rotationally driven structures can be applied in alternative embodiments of the invention.

The fan 16 and the shaft members 60, 80, 84 can also be selectively coupled directly to the shaft 30 to rotate at relatively high speeds. The second clutch 58 can be operably disposed to selectively couple the output shaft defined by the shaft members 60, 80, 84 with the shaft 30. In the exemplary embodiment of the invention, the second clutch 58 can be a friction plate clutch having a first pressing plate defined by the shaft member 80, a second pressing plate 88, and a plurality of friction plates such as friction plate 90 positioned between the first pressing plate defined by the shaft member 80 and the second pressing plate 88.

Figure 4:
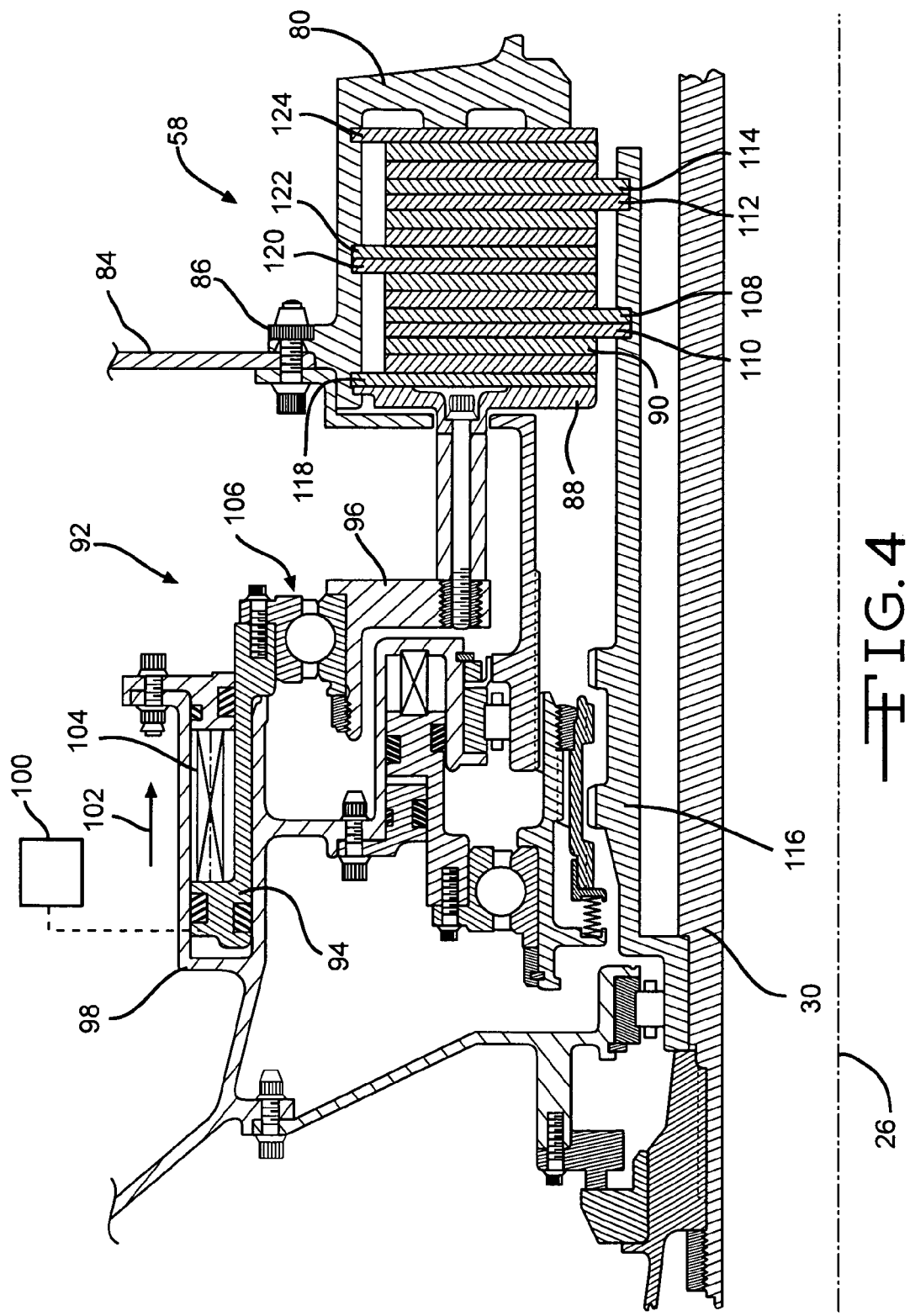
FIG. 4 is a magnified portion of FIG. 1 showing a second clutch for coupling the output rotatable member to a second input rotatable member.

The second clutch 58 can be disengaged during the low-speed mode of operation for the output shaft defined by the shaft members 60, 80, 84 in the exemplary embodiment of the invention. The second clutch 58 can be engaged when a high-speed mode of operation for the output shaft defined by the shaft members 60, 80, 84 is desired. Referring now to FIG. 4, the second clutch 58 can include an actuator 92 for moving the pressing plates 80 and 88 closer to one another to press the friction plates. The actuator 92 can include first and second links 94 and 96. The first link 94 can be guided in sliding movement by a stationary structure 98. The first link 94 can be moved by any means, including electrically, hydraulically, or pneumatically by a source of power 100 (shown schematically).

The first link 94 can be moved in a direction represented by an arrow 102 to move the second link 96 and the pressing plate 88 toward the pressing plate 80, thereby increasing the frictional forces between the friction plates. A spring 104 can bias the first link 94 in a direction opposite to the arrow 56 when the actuator 92 is disengaged. A bearing 106 can be disposed between the first and second links 94, 96 to allow the second link 96 and the pressing plates 80, 88 to rotate relative to the first link 94.

The exemplary second clutch 58 can include friction plates 108, 110, 112, 114 fixed to an extension 116 of the shaft 30. The shaft 30 and the extension 116 are fixed for rotation together. In the exemplary embodiment of the invention, the shaft 30 and the extension 116 are separately formed structures, but could be integral in alternative embodiments of the invention. Thus, the friction plates 108, 110, 112, 114 and the shaft 30 can be fixed for rotation together through the connection between the friction plates 108, 110, 112, 114 and the extension 116.

The exemplary second clutch 58 can also include friction plates 118, 120, 122, 124 fixed to the pressing plate 80. The pressing plate 80 and the friction plates 118, 120, 122, 124 can be fixed for rotation together. When the pressing plates 80, 88 are urged together, the friction plates (numbered and unnumbered in the drawings) are pressed together. Referring again to FIG. 2, the friction between the friction plates increases, resulting in engagement of the second clutch 58 and rotation of the output shaft defined by the shaft members 60, 80, 84 and shaft 30 at the same speed.

When the second clutch 58 is engaged, the first shaft member 60 can over-run the first clutch 56. In other words, the first shaft member 60 can rotate faster than the inner sleeve 66 (shown in FIG. 3) and the inner race 62 without damaging the first clutch 56. The inner sleeve 66 and the inner race 62 can continue to be driven in rotation by the gear assembly 42; this rotation is lost motion. Thus, the exemplary embodiment allows the fan 16 to be selectively driven along at least two separate paths of power transmission from the low pressure shaft 30, a source of rotational power, of the turbine engine 10. In alternative embodiments of the invention, more than two paths of power transmission can be defined if desired.

It is noted that in the exemplary embodiment the outer race 60 of the first clutch 56 and a first pressing plate 80 of the second clutch 58 can be fixed directly together for concurrent rotation. In alternative embodiments of the invention, the outer race 60 of the first clutch 56 and a first pressing plate 80 of the second clutch 58 can be integral. It is also noted that in the exemplary embodiment the forward fan 14 can be driven only by the shaft 30. In alternative embodiments of the broader invention, the fan 14 can be driven along more than path of power transmission.

As shown by the exemplary embodiment, the first and second clutches 56, 58 can be disposed on opposite sides of the output shaft along the centerline axis 26. Also, the first and second clutches 56, 58 can be spaced different distances from the axis 26. It is noted that that the first and second clutches 56, 58 can be radially stacked in alternative embodiments of the invention, wherein the first and second clutches 56, 58 would generally overlap along the axis 26.

Figure 5:
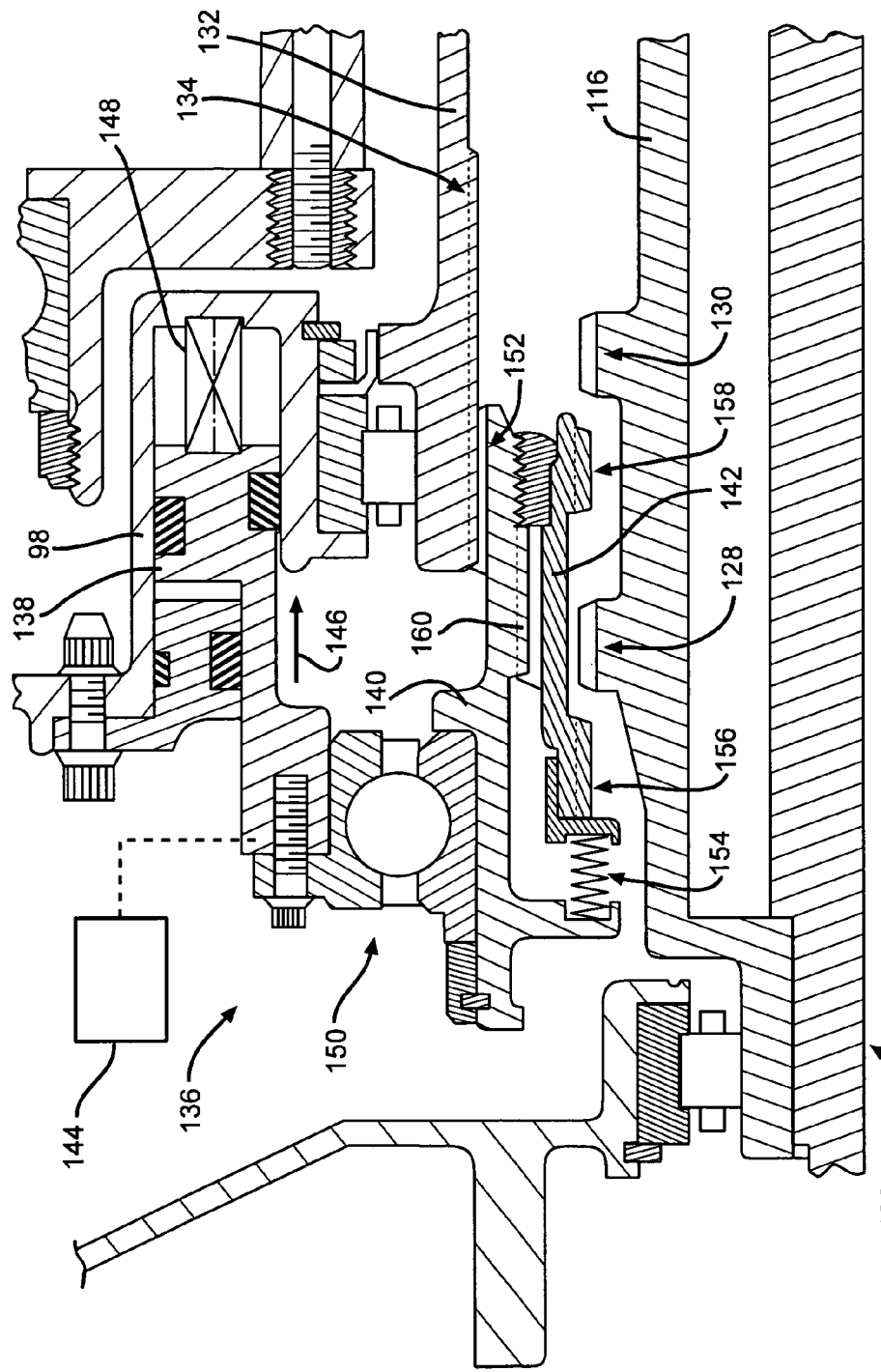
FIG. 5 is a magnified portion of FIG. 1 showing a spline lock mechanism operable to work jointly with the second clutch for coupling the output rotatable member and the second input rotatable member together.

Referring again to FIG. 2, the exemplary embodiment of the invention can also include a lock mechanism 126. The lock mechanism 126 can be similar to the design disclosed in U.S. Patent Application Publication No. 2007/0189848, which is hereby incorporated by reference. Referring net now to FIG. 5, the lock mechanism 126 can include a plurality of spline sections 128, 130 defined by the extension 116. The lock mechanism 126 can be desirable in operating environments in which relatively high levels of torque are to be transmitted between the output shaft defined by the shaft members 60, 80, 84 and shaft 30. The lock mechanism 126 can also include a member 132 fixed for rotation with the pressing plate 88 and therefore fixed for rotation with the output shaft defined by the shaft members 60, 80, 84. The member 132 can thus be part of the output shaft.

The member 132 can define a spline section 134. The lock mechanism 126 can include a moveable locking portion 136 operable to selectively lock the extension 116 and the member 132 together through the respective spline sections 82, 84, and 88. The exemplary locking portion 136 can include a first link 138, a second link 140, and a locking sleeve 142. The first link 138 can be guided in sliding movement by the stationary structure 98. The first link 138 can be moved by any means, including electrically, hydraulically, or pneumatically by a source of power 144 (shown schematically).

The first link 138 can be moved in a direction represented by an arrow 146 to move the second link 140 in the direction represented by the arrow 146. A spring 148 can bias the first link 138 in a direction opposite to the arrow 146 when the lock mechanism 126 is disengaged. A bearing 150 can be disposed between the first and second links 138, 140 to allow the second link 140 to rotate relative to the first link 138. The second link 140 can define a spline section 152 that engages the spline section 134 to guide axial movement of second link 140. Thus, the second link 140 can be coupled to the member 132 for rotation together and is therefore coupled to the output shaft defined by the shaft members 60, 80, 84 as well.

The second link 140 and the locking sleeve 142 can be engaged for relative movement. In the exemplary embodiment of the invention, the second link 140 and the locking sleeve 142 can move relative to one another axially. A spring 154 can be disposed between the second link 140 and the locking sleeve 142. In operation, the first and second links 138, 140 can be moved axially in the direction represented by the arrow 146 by movement of the first link 138. When spline sections 156 and 158 of the locking sleeve 142 abut the spline sections 128, 130 of the extension 116, respectively, the locking sleeve 142 can stop moving if the confronting spline sections 156-128 and 158-130 are not radially aligned. The spring 154 can then compress, biasing the locking sleeve 142 in the direction represented by the arrow 146.

As the spring 154 is compressed, the locking sleeve 142 can rotate relative to the second link 140. The locking sleeve 142 and the second link 140 by respective, mating helical splines, referenced at 160. The locking sleeve 142 can continue rotating relative to the second link 140 until the confronting spline sections 156-128 and 158-130 become aligned. When that occurs, the load generated the spring 154 can urge the confronting spline sections 156-128 and 158-130 into mating engagement. The confronting spline sections 156-128 and 158-130 can snap into place and lock together the member 132, the second link 140, the locking sleeve 142, and extension 116. Through this linkage, the output shaft defined by the shaft members 60, 80, 84 and the shaft 30 are locked together for the transmission of relatively high torque loads.

The second link 140 and the locking sleeve 142 can thus define a locking ring assembly movable along the axis 26 between a locked position and an unlocked position. The spline section 152 can define a first locking portion extending radially from the locking ring assembly circumferentially about the axis 26 for engaging the output shaft. The spline section 156 can define a second locking portion extending radially from the locking ring assembly opposite the first locking portion circumferentially about the axis 26 for engaging the shaft 30 (through the extension 116 in the exemplary embodiment). The spline section 158 can define a third locking portion spaced from the second locking portion along the axis 26 and extending radially from the locking ring assembly opposite the first locking portion circumferentially about the axis 26 for engaging the shaft 30 (through the extension 116 in the exemplary embodiment).

In the exemplary embodiment, the fan 16 can be driven in rotation along at least two separate paths of power transmission. The first path extends from the shaft 30 and through the gear arrangement 42 and the first clutch 56. The second path extends from the shaft 30 and through the second clutch 56. As a sprag clutch, the first exemplary clutch 56 can positively lock the fan 16 when the fan 16 is being driven along the first path. In other words, the output shaft defined by the shaft members 60, 80, 84 does not slip when driven through the first path. A sprag clutch is a positive-locking clutch. The exemplary second clutch 58 can be supplemented by the exemplary lock mechanism 126, which is structurally distinct from the exemplary second clutch 58. Thus, the output shaft and fan 16 can be positively locked when the fan 16 is being driven along any of the paths of power transmission.

Figure 6:
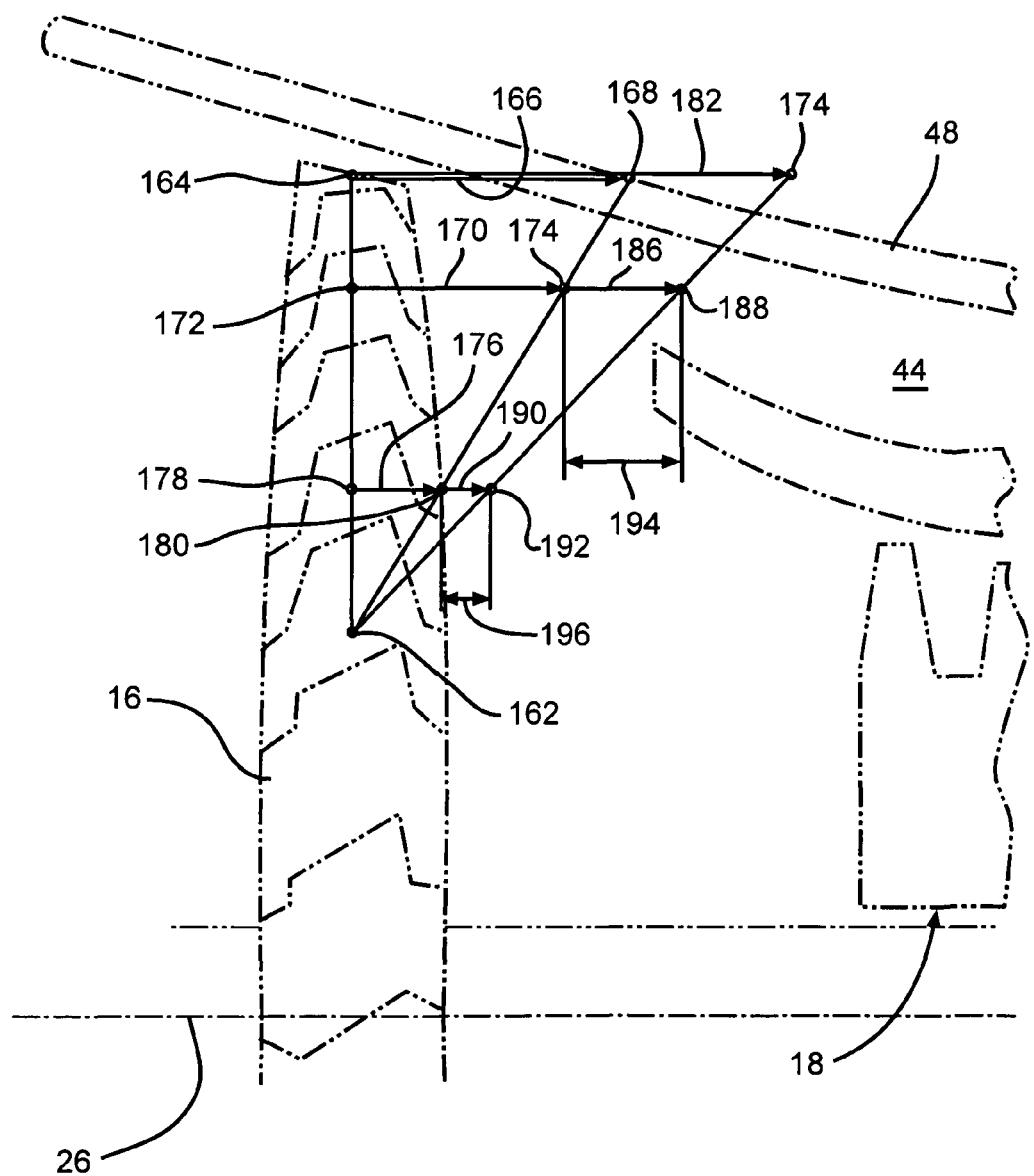
FIG. 6 is a simplified diagram showing a comparison of velocity profiles.

Referring again to FIG. 1, changing the speed of the output shaft driving the fan 16 during operation causes the bypass ratio to change without changing the speed of the shaft 30. The bypass ratio is at least partially dependent on the velocity of the air flow entering the respective inlets 52, 54. FIG. 6 is a simplified diagram showing a comparison of velocity profiles. A point 162 represents a radial outer edge of a hub of the fan 16. Generally, the velocity of the air directed by the fan is minimal at point 162. A point 164 represents a radial outer edge of blades of the fan 16. Generally, the velocity of the air directed by the fan is maximized at point 164.

When the fan 16 and the output shaft defined by the shaft members 60, 80, 84 (shown in FIG. 2) are driven in rotation at a relatively lower speed, through the first clutch 56 (shown in FIG. 1), the velocity of the air at the radial outer edge of blades of the fan 16 is represented by a vector 166, extending between the point 164 and a point 168. A first portion of the air flow will pass into the bypass duct 44 and a second portion of the air flow will pass into the compressor section 18. An average or mean velocity of the first portion air passing into the bypass duct 44 is represented by a vector 170, extending between a point 172 and a point 174. An average or mean velocity of the second portion air passing into the compressor section 18 is represented by a vector 176, extending between a point 178 and a point 180.

When the fan 16 and the output shaft defined by the shaft members 60, 80, 84 (shown in FIG. 2) are driven in rotation at higher speed, through the second clutch 58 (shown in FIG. 1), the velocity of the air at the radial outer edge of blades of the fan 16 is represented by a vector 182, extending between the point 164 and a point 184. An average or mean velocity of the first portion air passing into the bypass duct 44 during high-speed operation is represented by a vector 186, extending between the point 172 and a point 188. An average or mean velocity of the second portion air passing into the compressor section 18 during high-speed operation is represented by a vector 190, extending between the point 178 and a point 192.

FIG. 6 shows that the relative change in velocity is greater for the first portion of air, the air directed into the bypass duct 44. Arrow 194 represents the difference in magnitude between the velocities of air streams passing into the bypass duct 44 at low-speed and high-speed operations. Arrow 196 represents the difference in magnitude between the velocities of air streams passing into the compressor section 18 at low-speed and high-speed operations. The arrow 194 is larger than the arrow 196. Thus, the rate at which velocity changes for air passing into the bypass duct 44 is greater than the rate at which velocity changes for air passing into the compressor section 18 when the operation of the engine changes between low-speed and high-speed operations. In a graph correlating mass flow rate along the y-axis over fan rotation speed along the x-axis, the respective curves for the first and second portions of air flow would not be parallel. The curve for the first portion of air, the portion directed to the bypass duct 44, would be steeper than the curve for the second portion of air, the portion directed to the compressor section 18.

It is also noted that other mechanisms and approaches can be applied in conjunction with the exemplary embodiment to modify the bypass ratio. For example, additional valves/vanes can be positioned relative to the bypass duct 44 to adjust the mass flow rate of air through the bypass duct 44. Also, bypass flow can be diverted downstream of the inlet 54 to adjust the mass flow rate of air through the bypass duct 44.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. The right to claim elements and/or sub-combinations of the combinations disclosed herein is hereby reserved.

What is claimed is:

1. A dual clutch arrangement comprising:
a first input rotatable member;
an output rotatable member;
a first clutch coupling said first input rotatable member and said output rotatable member such that said first input rotatable member drives said output rotatable member in rotation, wherein said first clutch is operable to be overrun;
a second input rotatable member; and
a second clutch operable to selectively couple said second input rotatable member and said output rotatable member such that said second input rotatable member drives said output rotatable member in rotation, said second clutch including a first operational position wherein said second input rotatable member is rotationally disengaged from said output rotatable member, said second clutch having a second operational position wherein said second input rotatable member is rotationally engaged with said output rotatable member to drive said output rotatable member in rotation, wherein said first clutch is overrun when said second clutch is in said second operational position and rotationally engaged with said output rotatable member.

2. The dual clutch arrangement of claim 1 wherein said output rotatable member is operable to rotate about a first axis of rotation and wherein said first and second clutches are disposed on opposite sides of said output rotatable member along said first axis of rotation.

3. The dual clutch arrangement of claim 1 wherein said first clutch is a sprag clutch and said second clutch is a friction plate clutch, wherein an outer race of said first clutch and a first pressing plate of said second clutch are fixed directly together for concurrent rotation.

4. The dual clutch arrangement of claim 1 further comprising:
a lock mechanism operable to couple said output and second input rotatable members for rotation together when said second clutch is engaged to increase an amount of torque transmitted between said output and second input rotatable members.

5. The dual clutch arrangement of claim 4 wherein said lock mechanism further comprises:
a locking ring assembly movable along an axis of rotation of said output rotatable member between a locked position and an unlocked position;
a first locking portion extending radially from said locking ring assembly circumferentially about said axis of rotation for engaging one of said output rotatable member and said second input rotatable member;
a second locking portion extending radially from said locking ring assembly opposite said first locking portion circumferentially about said axis of rotation for engaging the other of said output rotatable member and said second input rotatable member; and
a third locking portion spaced from said second locking portion along said axis of rotation and extending radially from said locking ring assembly opposite said first locking portion circumferentially about said axis of rotation for engaging the other of said output rotatable member and said second input rotatable member.

6. The dual clutch arrangement of claim 5 wherein said lock mechanism is further defined as being structurally distinct from said second clutch.

7. The dual clutch arrangement of claim 1 wherein said output rotatable member is operable to rotate about a first axis of rotation and wherein said first and second clutches are radially offset from one another at different distances from said first axis of rotation.

8. The dual clutch arrangement of claim 1 wherein said first clutch remains coupled with said first input rotatable member when said second clutch is coupled with said second input rotatable member.

9. The dual clutch arrangement of claim 1 wherein said first input rotatable member continues to be driven and engaged with said first clutch when said second clutch is coupled with said second input rotatable member.

10. The dual clutch arrangement of claim 1 wherein said first and second clutches are structurally distinct from one another.

11. The dual clutch arrangement of claim 1 wherein said first clutch is of a first type and said second clutch is of a second type different from said first type.

12. The dual clutch arrangement of claim 11 wherein said first clutch is a sprag clutch and said second clutch is a friction plate clutch.

13. The dual clutch arrangement of claim 1 further comprising a rotational power source; and
wherein said first input rotatable member and said second input rotatable member are each commonly driven by said rotational power source.

14. The dual clutch arrangement of claim 1 further comprising a fan operable to direct air into one or more sections of a turbine engine; and
wherein said output rotatable member is coupled to said fan;
wherein said first input rotatable member is coupled to said output rotatable member by said first clutch to thereby drive said fan at a first rotational speed; and
wherein said second input rotatable member is selectively coupled to said output rotatable member by activation of said second clutch to said second operational position to thereby drive said fan at a second rotational speed different from said first rotational speed.

15. A dual clutch arrangement comprising:
a first input rotatable member;
an output rotatable member;
a first clutch coupling said first input rotatable member and said output rotatable member such that said first input rotatable member drives said output rotatable member in rotation, wherein said first clutch is operable to be overrun;
a second input rotatable member;
a second clutch operable to selectively couple said second input rotatable member and said output rotatable member such that said second input rotatable member drives said output rotatable member in rotation, wherein said first clutch is overrun when said second clutch is engaged; and
a gearing arrangement operably positioned between said second input rotatable member and said first input rotatable member, such that said second input rotatable member drives said first input rotatable member and that said gearing arrangement transmits rotation to said first input rotatable member at a reduced speed relative to said second input rotatable member.

16. A method comprising the steps of:
operating a turbine engine to produce thrust for a vehicle;
directing air into the turbine engine with a first fan during said operating step;
driving the first fan in rotation with a low pressure shaft of the turbine engine; and
changing a speed of the first fan during said operating step to change a bypass ratio of the turbine engine without changing a speed of rotation of the low pressure shaft.

17. The method of claim 16 further comprising the step of:
selectively driving the first fan through at least two separate paths of power transmission from the low pressure shaft.

18. The method of claim 16 further comprising the steps of:
disposing a second fan forward of the first fan along a centerline axis of the turbine engine;
driving the first fan through at least two separate paths of power transmission; and
driving the second fan through a fewer number of paths of power transmission than the paths of power driving the first fan.

19. The method of claim 16 further comprising the step of:
driving the first fan through at least two separate paths of power transmission; and
positively locking the first fan when the first fan is being driven through any of the at least two separate paths of power transmission.

20. The method of claim 19 wherein said positively locking step includes the steps of:
locking the first fan for rotation through a first path of power transmission through a positive-locking clutch; and
locking the first fan for rotation through a second path of power transmission through a lock mechanism distinct from a clutch disposed along the second path of power transmission.

21. The method of claim 20 further comprising the step of:
activating the clutch disposed along the second path of power transmission and the lock mechanism with separate actuators.

22. The method of claim 16 wherein the driving of the fan in rotation with the low pressure shaft comprises:
driving the fan in rotation about a rotational axis at a first rotational speed through a first power transmission path; and
driving the fan in rotation about the rotational axis at a second rotational speed different from the first rotational speed through a second power transmission path to facilitate the changing of speed of the fan without changing the speed of the low pressure shaft.

23. The method of claim 16 wherein the driving of the fan in rotation comprises initially driving the fan at a first rotational speed through a first power transmission path coupled with the low pressure shaft; and
wherein the changing of speed of the fan without changing the speed of the low pressure shaft comprises selectively driving the fan at a second rotational speed different from the first rotational speed by selectively coupling a second power transmission path with the low pressure shaft without decoupling the first power transmission path from the low pressure shaft.

24. A turbine engine comprising:
a compressor section;
a bypass duct encircling said compressor section and extending along a centerline axis of the turbine engine;
a first fan operable to direct air into said compressor section and said bypass duct;
an output shaft coupled to said first fan;
a first input shaft;
a first clutch coupling said first input shaft and said output shaft such that said first input shaft drives said output shaft and said first fan in rotation, wherein said first clutch is operable to be overrun;
a second input shaft;
a second clutch operable to selectively couple said second input shaft and said output shaft such that said second input shaft drives said output shaft and said first fan in rotation, wherein said first clutch is overrun when said second clutch is engaged.

25. The turbine engine of claim 24 wherein said first clutch is positioned aft of said first fan and said second clutch is positioned forward of said first clutch along said centerline axis.

26. The turbine engine of claim 24 further comprising:
a gear assembly operable to transmit power to the first input shaft from a low pressure shaft of the turbine engine.

27. The turbine engine of claim 26 wherein said second input shaft is further defined as said low pressure shaft.

28. The turbine engine of claim 24 further comprising:
a second fan positioned forward of the first fan and driven in rotation by said second input shaft.

29. The turbine engine of claim 24 further comprising:
a lock mechanism operable to selectively couple said output and second input shafts for rotation together when said second clutch is engaged to increase an amount of torque transmitted between said output and second input shafts.

* * * * *